United States Patent [19]

Claverie

[11] 4,236,611
[45] Dec. 2, 1980

[54] BRAKE SHOE ADJUSTING STRUCTURE FOR A DRUM BRAKE

[75] Inventor: Jean-Claude Claverie, Coubron, France

[73] Assignee: Societe Anonyme DBA, Paris, France

[21] Appl. No.: 27,187

[22] Filed: Apr. 4, 1979

[51] Int. Cl.³ .............................................. F16D 65/56
[52] U.S. Cl. .......................... 188/79.5 P; 188/106 A; 188/196 D; 192/111 A
[58] Field of Search .................. 188/79.5 P, 79.5 GE, 188/79.5 GC, 79.5 K, 79.5 S, 79.5 GT, 79.5 R, 196 D, 196 BA, 106 A; 192/111 A

[56] References Cited

U.S. PATENT DOCUMENTS

| | | | |
|---|---|---|---|
| 2,287,238 | 6/1942 | Goepfrich | 188/196 BA |
| 3,357,527 | 12/1967 | Bauman et al. | 188/79.5 GC |
| 3,709,334 | 1/1973 | Kondo | 188/79.5 P |
| 3,717,227 | 2/1973 | Rath | 188/79.5 P |
| 4,039,055 | 8/1977 | Meyer et al. | 188/79.5 GC |

FOREIGN PATENT DOCUMENTS 2802980 7/1978 Fed. Rep. of Germany ... 188/79.5 GE

*Primary Examiner*—George E. A. Halvosa
*Attorney, Agent, or Firm*—Paul David Schoenle; Ken C. Decker

[57] ABSTRACT

A drum brake includes a pair of brake shoes which are carried by and pivotally anchored to a backing plate. The pair of shoes are engageable with a brake drum to effect a brake application. A running clearance is maintained between the brake shoes and the drum when the brakes are released by an adjusting member which includes an adjusting lever pivotally carried by one of the shoes and a fixed-length spacer carried between the adjusting lever and the other brake shoe. An extensible member is carried between one end of the adjusting lever and the one brake shoe and a three-bar linkage effects an extension of the member to compensate for wear of the brake shoes. The adjusting lever forms one bar of the linkage and carries the other two bars. The second bar of the linkage is pivotally engaged with the adjusting lever and with the spacer and is biased so as to move the spacer away from the adjusting lever during a brake application. The third bar is pivoted to the second and guided by the one end of the lever for movement perpendicular to the extensible member. Pivoting of the first bar relative to the lever translates the third bar relative to the extensible member. A one-way driving connection between the third bar and the extensible member provides a degree of lost motion which corresponds to a predetermined brake shoe wear.

12 Claims, 7 Drawing Figures

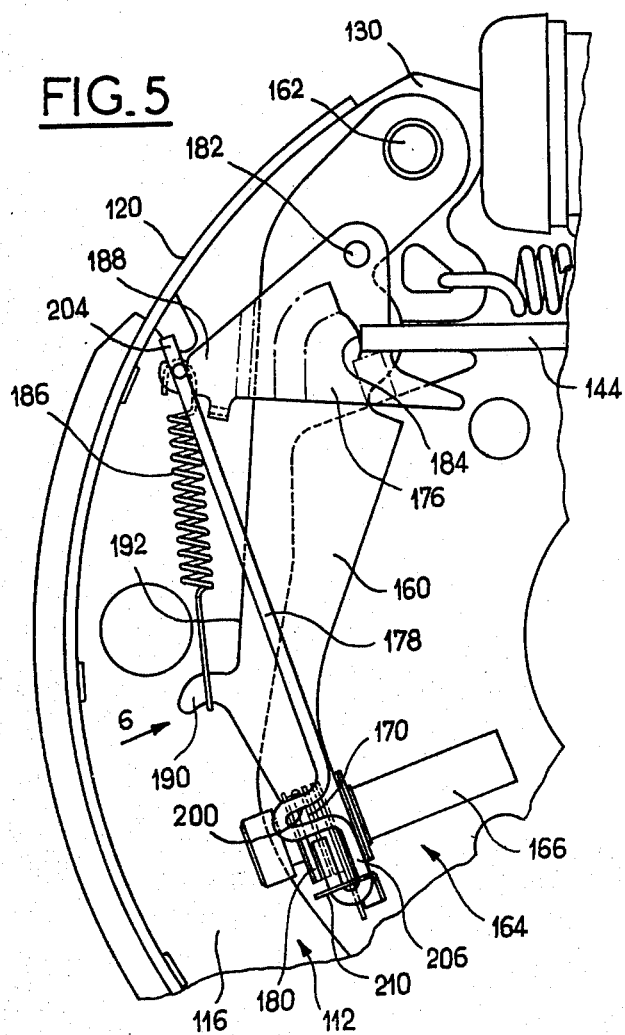
FIG. 5
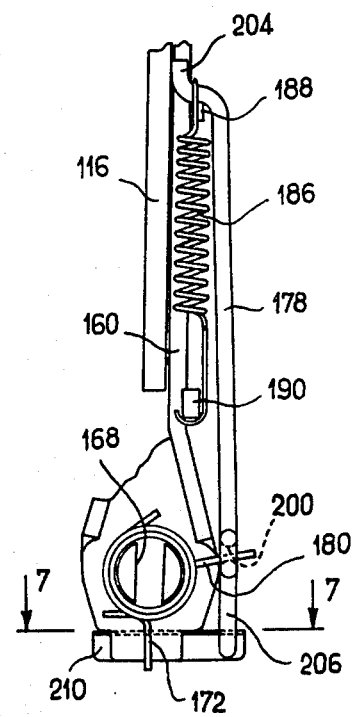
FIG. 6
FIG. 7

BRAKE SHOE ADJUSTING STRUCTURE FOR A DRUM BRAKE

The invention relates to a drum brake, more particularly for a motor vehicle.

In particular, the invention relates to a drum brake equipped with a self-adjusting device for automatically compensating for wear on the friction linings attached to the brake shoes, so that the distance to be travelled by the brake pedal in order to operate the brake remains substantially constant and short.

Numerous drum brakes with self-adjusting devices are known, but most of these devices have various disadvantages. In particular, the devices usually effect adjustment without distinguishing between an increase in the distance between the shoes due to wear on the linings and an increase due to expansion of the drum owing to heating of the brake. To eliminate the resulting risk of over-adjustment, it is usual to provide a large operating clearance, which involves extensive idle travel of the brake pedal. However, the known drum brakes include one brake which almost totally overcomes this disadvantage. This brake has two shoes of which the adjoining ends are separated by a wheel cylinder and a fulcrum block respectively. The adjusting device comprises a spacer situated between the shoes in the vicinity of the wheel cylinder and cooperating with an adjusting lever pivoted on a first one of these shoes, the free end of this lever cooperating with the shoe by way of an extensible member. This extensible member is formed by a threaded rod prevented from rotating relative to the shoe and by a nut screwed on to this rod and prevented from effecting translatory motion relative to the adjusting lever; a first friction spring prevents the nut from turning in a direction such that the nut moves nearer the first shoe. The nut is turned in the opposite direction by a second lever pivoted on the adjusting lever and kept in permanent contact with the spacer by resilient means, the free end of the second lever defining a cam surface which cooperates with the bent end of a second friction spring mounted on the nut.

In a brake of this type, operation of the wheel cylinder has the dual result of applying the friction linings of the shoe to the brake drum and of pivoting the second lever relative to the adjusting lever, so that the nut is turned in a direction such that it moves away from the first shoe when the brake is released. Such a device allows the adjustment made to be restricted to very small amounts, owing to the double reduction effected by the adjusting lever and by the extensible member consisting of the threaded rod and its nut, thus eliminating the over-adjustment inherent in the majority of the other known adjusting devices. This is important because the wear on the friction linings is very slow, in contrast to the expansions or deformations of the drum, and consequently the adjusting device just described, because the adjustments it makes are very small, cannot compensate for the deformations in the drum and can respond practically only to very slow phenomena, i.e. the phenomena linked to wear.

However, this device has the disadvantage that the motion of the cam surface formed on the free end of the second lever is substantially parallel to the axis of the extensible member, whereas the movement transmitted to the nut must be perpendicular to this axis. This movement is therefore due entirely to the shape of the cam surface defined on the free end of the second lever, and it makes the device's efficiency very low because the operating force transmitted by the cam surface to the second friction spring then corresponds only to a small proportion of the pivoting force transmitted by the link to the second lever.

The invention proposes a drum brake which has the advantages of the brake just described, especially elimination of the risk of over-adjustment of the brake, and which is substantially more efficient.

To this end, the invention proposes a drum brake comprising two lined shoes which can be urged into frictional engagement with a rotary drum by brake applying means situated between two first ends of the shoes, a fixed fulcrum block situated between the other two ends of the shoes, a spacer mounted in the vicinity of the brake applying means between an adjusting lever pivoted on a first one of the shoes and the second shoe, an extensible member situated between the free end of the adjusting lever and the first shoe, the member comprising a first element prevented from rotating and a second element, rotation of which causes the member to extend, adjusting means being provided to rotate the second element when the wear on the linings of the shoes exceeds a predetermined value, characterised in that the adjusting means comprise a link capable of moving in a direction substantially perpendicular to the axis of the extensible member under the influence of a counter-link kept in permanent contact with the spacer by resilient means, so as to rotate the second element of the extensible member by way of a one-way coupling.

According to another feature of the invention, the link is pivoted by means of a first end of the counter-link, guide means being provided at the free end of the adjusting lever to prevent the second end of the link from moving in a direction parallel to the axis of the extensible member.

Thanks to these features, of course, the pivoting motion of the counter-link is converted at the link into motion which is close to translatory motion, particularly at the end of the link cooperating with the one-way coupling, so that the force transmitted to the latter and the efficiency of the resulting device are appreciably greater.

Two particular embodiments of the invention will now be described by way of example only with reference to the accompanying drawings, in which: FIG. 1 is an elevation of a drum brake embodying the principles of the invention;

FIG. 5 is a detail showing another embodiment of the adjusting device illustrated in FIG. 1;

FIG. 6 is a view as indicated by an arrow 6 in FIG. 5; and

FIG. 7 represents a section along a line 7—7 in FIG. 6.

Figure 1:
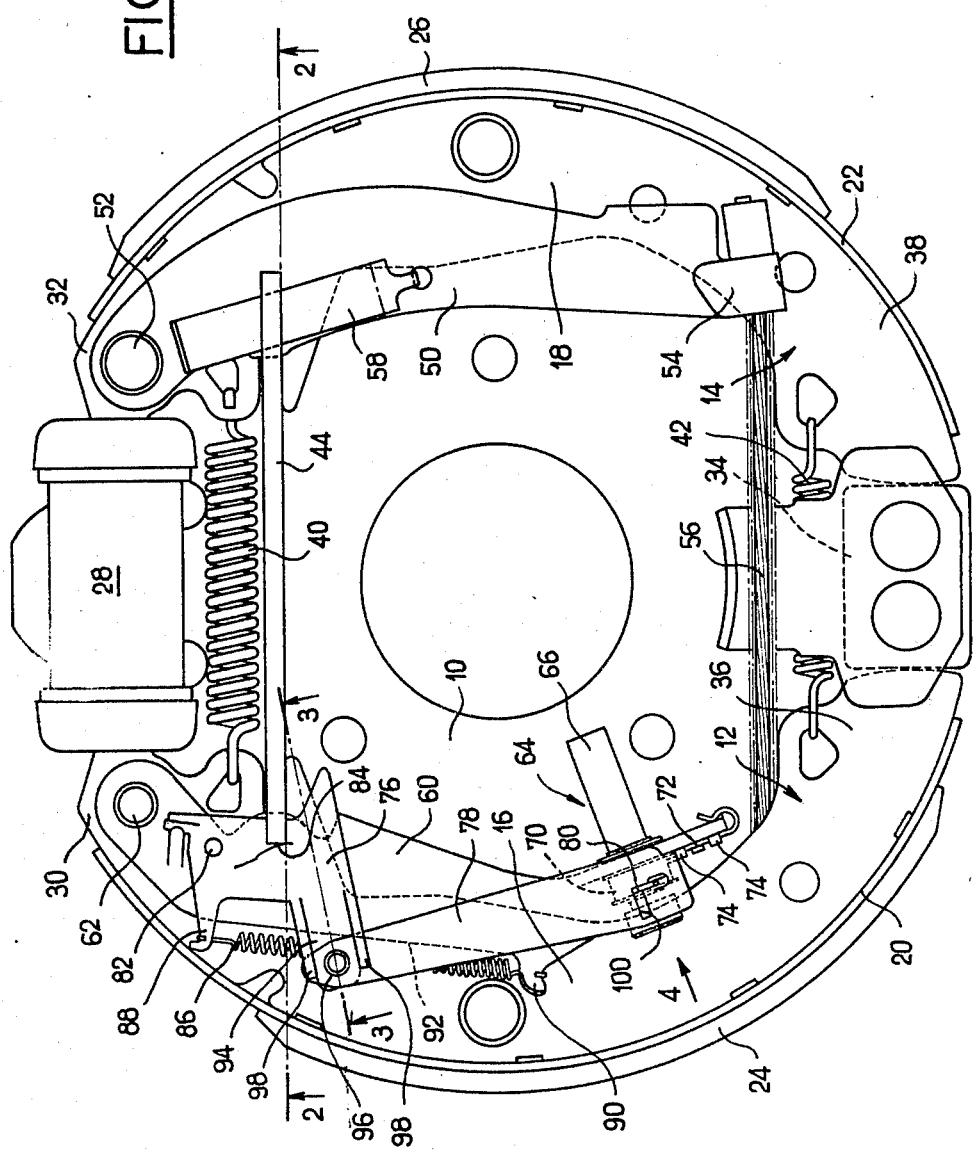

The drum brake illustrated in FIG. 1 comprises a support plate 10 designed to be attached to a fixed part of the vehicle and slidably receiving two brake shoes 12, 14. The respective shoes 12, 14 have a substantially flat web 16, 18 and an arcuate flange 20, 22, on which a friction lining 24, 26 is mounted by means of rivets or the like. Brake applying means, comprising a wheel cylinder 28 in the embodiment illustrated, are provided between the first two adjoining ends 30, 32 of the shoes 12, 14 respectively; and a fulcrum block 34, attached to the support plate 10, is situated between the other two ends 36, 38 of the shoes 12, 14. Also, respective return springs 40, 42 are provided in the vicinity of the wheel cylinder 28 and fulcrum block 34 to urge the ends 30, 32 of the shoes on to the wheel cylinder 28 and the ends 36, 38 of the shoes on to the fulcrum block 34.

Figure 2:
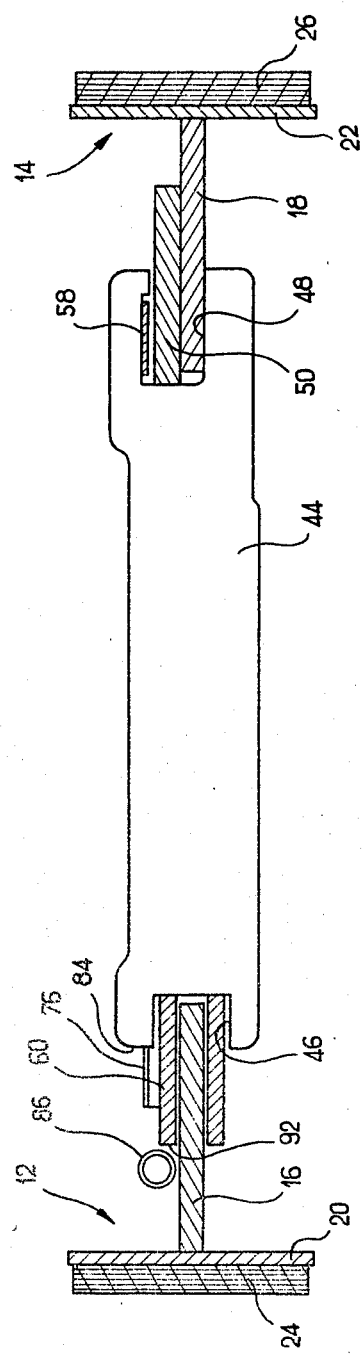
FIG. 2 is a section along a line 2—2 in FIG. 1.

As FIG. 2 shows, a spacer 44 is provided between the shoes 12, 14 in the vicinity of the wheel cylinder 28 in order to define the distance which separates the shoe ends 30, 32 in the idel position. The respective ends of the spacer 44 contain U-shaped notches 46, 48 respectively to receive the webs 16, 18 of the shoes 12, 14. In the embodiment illustrated, the notch 48 also receives a handbrake operating lever pivoted on the end 32 of the shoe 14 by means of a pivot-forming rivet 52. The free end 54 of the handbrake lever is bent to receive one end of a handbrake operating cable 56, of which the other end (not shown) is connectable to a handbrake in the driver's compartment of the vehicle. Lastly, the notch 48 also receives a leaf spring 58 which rests both on one edge of the notch and on the lever 50 and so urges the latter on to the web 18 of the shoe 14 in a direction substantially parallel to the axis of the brake drum (not shown).

In addition to the web 16 of the shoe 12, the other notch 46 in the spacer 44 receives an adjusting lever 60 of which the cross-section, along at least part of its length, takes the shape of a U of which the two arms are parallel and face on to respective sides of the web 16 of the shoe 12. The adjusting lever 60 is pivoted at one of its ends on the end 30 of the shoe 12 by means of a pivot-forming rivet 62, and its free end abuts on the web 16 of the shoe 12 by way of an extensible member 64, so that the distance which separates the ends 30, 32 of the shoes 12, 14 respectively in the idle position varies according to the length of the extensible member 64.

The extensible member 64 consists, in the embodiment illustrated, of a threaded rod 66 of which one end contains a slot 68 receiving the web 16 of the shoe 12, and on to which a nut 70 is screwed. The nut is urged on to the bottom of the U defined by the adjusting lever 60 by a friction spring 72, which is received on an appropriate surface of revolution (not shown) formed on the nut 70 and of which one end is bent to form a hook so as to immobilize the nut 70 relative to the adjusting lever 60 in a direction parallel to the axis of the extensible member 64, the bent end of the spring 72 being also situated between studs 74 formed on the lever 60, to prevent the spring 72 from turning relative to the lever 60.

In accordance with the invention, adjusting means are provided to turn the nut 70 in a direction such that it will move away from the web 16 of the shoe 12 when the wear on the linings 24, 26 exceeds a predetermined value. These adjusting means comprise a counter-link 76, a link 78, and a one-way coupling comprising the friction spring 72 and a second friction spring 80, which is also received on an appropriate surface of revolution (not shown) formed on the nut 70. The counter-link 76 is a metal blade which is pivoted on that side of the adjusting lever 60 remote from the web 16 of the shoe 12 by means of a pivot 82, and which is held in permanent contact with the end 84 of the link 44 by a helical spring 86, the ends of which are fastened respectively to a hooked extension 88 of the counter-link 76 and to a hooked extension 90 of the adjusting lever 60, each of the extensions 88, 90 extending radially towards the flange 20 of the shoe 12 so that the spring 86 is between this flange 20 and the outer radial edge 92 of the lever 60. As a result of this arrangement the spring 86 has the effect of simultaneously and permanently urging the counter-link 76 into contact with the end 84 of the spacer 44 and the free end of the adjusting lever 60 into contact with the web 16 of the shoe 12 by way of the extensible member 64. Note also that the pivoting axis 82 of the counter-link 76 is situated substantially between the pivoting axis 62 of the adjusting lever 60 and that portion of the counter-link 76 cooperting with the end 84 of the spacer 44.

Figure 3:
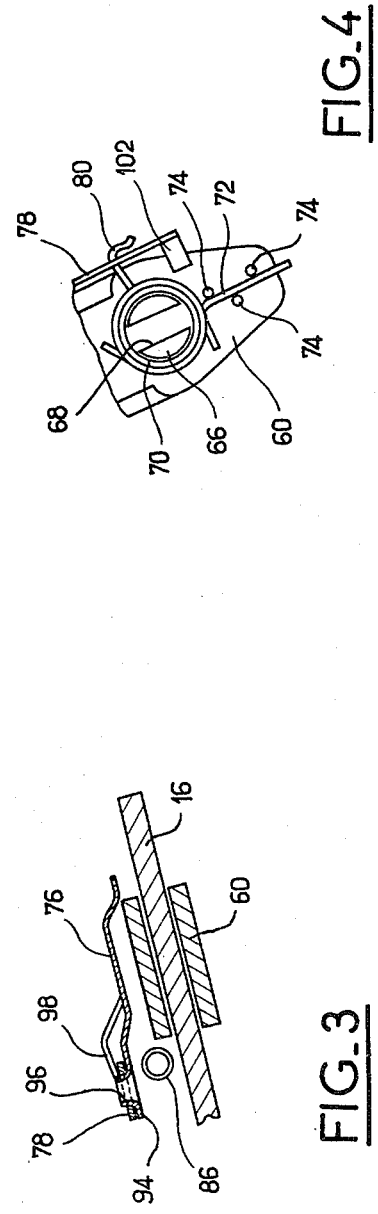
FIG. 3 represents a section along a line 3—3 in FIG. 1.

As best shown in FIGS. 1 and 3, the counter-link 76 bears a second outer radial extension 94 containing an embossed pivot 96 to pivotably receive a first end of the link 78. Also, the extension 94 of the counter-link 76 has two arms 98 to prevent the link 78 from escaping from the pivot 96 parallel to the axis of the brake drum. The link 78 itself comprises a metal blade which, in accordance with the invention, defines between the pivot 96 and its opposite end, by which it cooperates with the friction spring 80, an axis substantially perpendicular to the axis of the extensible member 64.

Figure 4:
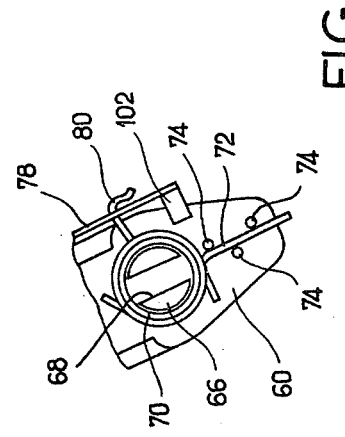
FIG. 4 is an end view as indicated by an arrow 4 in FIG. 1 and illustrating part of the end of the adjusting lever and of the link, with the extensible member.

As FIG. 1 shows, the free end of the link 78 contains a recess 100 which in the embodiment illustrated comprises a slot substantially parallel to the axis of the extensible member 64, and which receives one end of the friction spring 80, this end being bent radially outwards. Also, guide means are provided at the free end of the adjusting lever 60 to prevent the end of the link 78 containing the recess 100 from moving parallel to the axis of the extensible member 64. As best shown in FIGS. 1 and 4, these guide means comprise, firstly, a curved lug 102 on the link 78 which engages the inner surface of the bottom of the U defined by the adjusting lever 60, so preventing movement towards the right of the bottom end of the link 78 relative to the extensible member 64 as seen in FIG. 1, and, secondly, the bent end of the friction spring 80 which engages the right-hand end of the recess 100 to prevent the bottom end of the link 78 from moving to the left in FIG. 1. Lastly, the width of the recess in the link 78 is greater than the corresponding width of the bent end of the friction spring 80, so defining a predetermined clearance beyond which the nut 70 is rotated by the adjusting means comprising the counter-link 76, link 78 and spring 80 on operation of the wheel cylinder 28.

The drum brake just described with reference to FIGS. 1 to 4 operates as follows.

In the idle position, and when the friction linings 24, 26 are new, the various components of the brake occupy the positions illustrated in the Figures. During operation of the wheel cylinder 28, the ends 30, 32 of the shoes 12, 14 are urged apart so that the friction linings 24, 26 are brought into engagement with the brake drum (not shown) in order to generate a braking torque. Simultaneously the spacer 44 moves to the right in FIG. 1 with the end 32 of the shoe 14 under the influence of the leaf spring 58. Owing to the action of the spring 86 which keeps the free end of the adjusting lever 60 in permanent contact with the web 16 of the shoe 12 by way of the extensible member 64, while keeping the counter-link 76 in permanent contact with the end 84 of the spacer 44, the counter-link 76 is turned anticlockwise on its pivot 82. As a result the pivot 96 formed on the extension 94 of the counter-link 76 moves in a direction substantially parallel to the axis of the link 78 due to the simultaneous motion of the pivot 82 resulting from the separating of the end 30 of the shoe 12 by the wheel cylinder 28 and the pivoting of the counter link 76 on this pivot. The link 78, being also guided at its other end by the lug 102 and by the sring 80, therefore moves downwards in a direction approximately parallel to its axis, the latter remaining substantially perpendicular to the axis of the extensible member 64. When the translatory motion of the link 78 exceeds the predetermined clearance between the bent end of the friction spring 80 and the recess 100, this movement of the link 78 causes the friction spring 80 to turn clockwise in FIG. 4 through an angle corresponding to the wear on the friction linings 24, 26 since the previous operation of the wheel cylinder 28. When the friction spring 80 is turned in this direction, the frictional force attaching it to the nut 70 tends to decrease whereas rotation of the nut 70 in this direction tends to increase the frictional force existing between the nut and the friction spring 72. Consequently the nut 70 is still prevented from rotating and the spring 80 turns on the nut through an angle determined by the wear on the linings 24, 26. When the wheel cylinder 28 is released, the return spring 40 tends to return the ends 30, 32 of the shoes 12, 14 to their idle positions. During this movement the end 84 of the spacer 44 is urged to the left in FIG. 1 and pivots the counter-link 76 clockwise on its pivot 82 through an angle equal to and opposite to the angle of rotation of this link during operation of the wheel cylinder 28. This results in translatory motion of the link 78 substantially parallel to its axis, upwards in FIG. 1, by a distance equal to the distance covered by this link in the opposite direction during operation of the wheel cylinder, with the consequence that the friction spring 80 is turned counterclockwise in FIG. 1 through an angle equal and opposite to the angle through which this spring turns on the nut 70 during operation of the brake. In this way the frictional force exerted between the friction spring 80 and nut 70 tends to increase, whereas the frictional force exerted between the nut and the spring 72 tends to decrease so that the nut 70 is turned on the threaded rod 66 through an angle corresponding to the wear to which the linings 24, 26 have been subjected during the previous operation of the brake. This rotation of the nut 70 occurs in the direction such that the nut moves away from the web 16 of the shoe 12, with the result that the adjusting lever 60 pivots slightly anticlockwise on the rivet 62, so slightly increasing the distance separating the shoe ends 30, 32 in the idle position by way of the spacer 44 on which the adjusting lever 60 is made to abut when the brake resumes its idle position.

The invention permits both very accurate, continuous adjustment and a very substantial increase in the efficiency of known adjusting devices of this type, in particular because the rotation of the friction spring 80 is due to the movement of a link 78 in a direction substantially perpendicular to the axis of the extensible member and, in particular, of the nut 70 on which this friction 80 is mounted. Also, the adjusting device in accordance with the invention is of a very simple design and consequently cheap and very reliable in operation.

FIGS. 5 to 7 illustrate a variant of the adjusting device for the drum brake shown in FIGS. 1 to 4. In this variant, elements fulfilling substantially identical functions to elements in the first embodiment are designed by the same reference numerals plus 100.

The drum brake in this second embodiment of the invention differs from the drum brake shown in FIG. 1 only in the adjusting means which extend the extensible member, for which reason only part of the brake is shown in FIG. 5. As in the previous embodiment, these adjusting means comprise a counter-link 176 pivoted by means of a pivot 182 on an adjusting lever 160 which in turn is pivotable on a pivot-forming rivet 162 on the end 130 of the web 116 of the shoe 112. The adjusting means also comprise a link 178 and a friction spring 180, the latter being mounted on an appropriate surface of revolution (not shown) defined on a nut 170 attached to a threaded rod 166 which, with the nut 170, constitutes an extensible member 164 situated between the free end of the adjusting lever 160 and the web 116 of the shoe 112. As in the previous embodiment, the nut 170 is connected to the free end of the adjusting lever 160 in respect of translatory motion by a second friction spring 172, and the threaded rod 166 is prevented from rotating by a slot 168 receiving the web 116 of the shoe 112. Also, a helical spring 186 is provided between a hooked extension 188 of the counter-link 176 and a hooked extension 190 of the adjusting lever 160, the extensions 188 and 190 extending radially towards the arcuate flange 120 of the shoe 112 so that the spring 186 is housed between this flange 120 and that edge 192 of the adjusting lever facing this flange. The spring 186 is therefore continuously urging the counter-link 176 into contact with one end 184 of the spacer 144, and the free end of the adjusting lever 160 into contact with the web 116 of the shoe 112 by way of the extensible member 164. As in the previous embodiment, the pivot 182 for the counter-link 176 is situated substantially between the rivet 162 on which the adjusting lever 160 is pivoted and that part of the counter-link 176 bearing on the end 184 of the spacer 144, and the counter-link comprises a metal blade situated on that side of the adjusting lever 160 remote from the web 116 of the shoe 112.

The variant illustrated in FIGS. 5 to 7 differs from the first embodiment of the invention essentially in that the link 178 comprises a substantially straight metal rod, of which one end 204 is bent into an S (FIG. 6) so as to bear on the hooked extension 188 and act directly as a hook for the upper end of the spring 186 (in FIGS. 5, 6). Note that this arrangement has the advantage of preventing the creation of play at the fulcrum between the counter-link 176 and link 178, since the spring 186 continuously urges the end 204 of the link 178 into contact with the hooked extension 188 of the counter-link 176. As best shown in FIG. 5, the other end of the link 178 is bent into a U to define a recess 200 to receive the end of the friction spring 180, this spring end being bent radially outwards. Also, the free end 206 of the link 178 is bent into a U and is received in an appropriate aperture 208 in a plate 210 attached to the end of the adjusting lever 160, so defining guide means preventing any motion of the end 206 or of the link 178 parallel to the axis of the extensible member 164, while allowing motion of the link 178 parallel to its axis, which, as in the previous embodiment, is substantially perpendicular to the axis of the extensible member 164.

The operation of the drum brake partly shown in FIGS. 5 to 7 and of the associated adjusting device is the same as that explained with reference to FIGS. 1 to 4 and will therefore not be described here. Moreover, the second embodiment of the invention has the same advantages as the first.

Obviously, the two drum brakes just described by way of example do not restrict the scope of the invention, which may be applied to different variants, relating both to the nature of the brake operating means and to possible omission of the handbrake operating lever. Modifications may also be made to the adjusting device itself, particularly as regards the structure and shape of its various components.

In particular, the assembly consisting of the two friction springs may be replaced by any other device constituting a one-way coupling, and the two components of the extensible member may be reversed so that the rotary motion can be transmitted to the threaded rod, in which case the nut is prevented from rotating relative to the shoe.

I claim:

1. A drum brake comprising two lined shoes which can be urged into frictional engagement with a rotary drum by brake applying means situated between the first ends of the shoes, a fixed fulcrum block situated between the other two ends of the shoes, a spacer mounted between an adjusting lever pivoted on a first one of the shoes and the second shoe, said adjusting lever including a free end, an elongated extensible member situated between the free end of the adjusting lever and the first shoe, said extensible member defining an axis; the extensible member comprising a first element prevented from rotating and a second element, rotation of which causes the member to extend; adjusting means being provided to rotate the second element when the wear on the linings of the shoes exceeds a predetermined value, characterized in that the adjusting means comprise a counter-link pivoted on said adjusting lever and yieldably biased by resilient means into pivotal contact with said spacer, movement of said spacer upon a brake application causing pivotal movement of said counter-link relative to said adjusting lever, a link engaging said counter-link at a pivot and extending between said counter-link and said extensible member, said link terminating in a one end adjacent the free end of said adjusting lever, means for guiding the movement of said one end of said link relative to said free end of said adjusting lever in translation substantially perpendicular to said axis of said extensible member, a one-way coupling drivingly connecting said link to said second element; whereby relative movement of said pair of brake shoes, and said spacer and adjusting lever, upon a brake application causes pivotal movement of said counter-link; said counter-link driving said link to rotate said second element if the lining wear has exceeded said predetermined value.

2. A drum brake as claimed in claim 1 characterized in that the resilient means are situated between the counter-link and adjusting lever so as to simultaneously urge the counter-link into contact with the spacer and the free end of the adjusting lever toward the first shoe.

3. A drum brake as claimed in claim 1 characterized in that the pivotal connection of the counter-link with the adjusting lever is situated substantially between the pivotal connection of the adjusting lever with the one brake shoe and the contact point of the counter-link with the spacer.

4. A drum brake as claimed in claim 1, characterized in that the counter-link engages the link at a pivot which is offset radially outwards relative to the contact point between the counter-link and the spacer.

5. A drum brake as claimed in claim 2, 3, or 4, characterized in that the resilient means comprise a helical spring of which the first end is associated with the counter-link in the vicinity of the pivot between the counter-link and the link, and the second end is associated with the adjusting lever in the vicinity of the free end of the latter.

6. A drum brake as claimed in claim 5, characterized in that each of the shoes comprises a substantially flat web and an arcuate flange on which a friction lining is mounted, the adjusting lever comprising at least one substantially flat plate pivoted on the web of the first shoe so as to define an inner radial edge and an outer radial edge, the spring being situated between the outer radial edge of the adjusting lever and the flange of the first shoe.

7. A drum brake as claimed in claim 6, characterized in that the counter-link comprises a metal blade pivoted on that surface of the adjusting lever remote from the web of the first shoe, the counter-link and adjusting lever each comprising at least one hooked extension projecting radially towards the flange of the first shoe to receive respective ends of the spring.

8. A drum brake as claimed in claim 7 characterized in that the link comprises a metal blade pivoted by its first end on a second extension of the counter-link, which extension projects radially towards the flange of the first shoe, and of which the second end cooperates with the guide means associated with the free end of the adjusting lever.

9. A drum brake as claimed in claim 8 characterized in that the link comprises a substantially straight metal rod of which the first end is bent in the hooked extension of the counter-link to receive the corresponding end of the spring and of which the second end cooperates with the guide means associated with the free end of the adjusting lever.

10. A drum brake as claimed in claim 1, characterized in that the one-way coupling comprises a friction spring received on an appropriate surface of revolution formed on the second element of the extensible member, the friction spring comprising an end which enters a recess in the one end of the link.

11. A drum brake as claimed in claim 10 characterized in that the width of the recess perpendicular to the axis of the extensible member is greater than the corresponding width of the first end of the first friction spring, in order to define the said predetermined value beyond which the second element is rotated by the adjusting means.

12. A drum brake as claimed in claim 11, characterized in that the one-way coupling comprises a second friction spring received on a second appropriate surface of revolution formed on the second element of the extensible member, the second friction spring comprising an end by which it is connected to the free end of the adjusting lever.

* * * * *